(12) United States Patent
Fuller et al.

(10) Patent No.: US 6,486,771 B1
(45) Date of Patent: Nov. 26, 2002

(54) TIRE INFLATION GAS TEMPERATURE, PRESSURE, AND OXYGEN MONITORING SYSTEM

(75) Inventors: Timothy C. Fuller, Clackamas, OR (US); Melvin M. Priday, Clackamas, OR (US); Max E. Butz, Tumwater, WA (US)

(73) Assignee: Fuller Brothers, Inc., Clackamas, OR (US)

( * ) Notice: Subject to any disclaimer, the term of this patent is extended or adjusted under 35 U.S.C. 154(b) by 0 days.

(21) Appl. No.: 09/800,599

(22) Filed: Mar. 6, 2001

Related U.S. Application Data

(63) Continuation-in-part of application No. 09/330,534, filed on Jun. 11, 1999, now Pat. No. 6,292,095, which is a continuation-in-part of application No. 09/038,761, filed on Mar. 11, 1998, now Pat. No. 6,025,777.

(51) Int. Cl.[7] .............................................. B60C 23/00
(52) U.S. Cl. ...................... 340/442; 340/447; 73/146.2; 73/146.8; 200/61.22
(58) Field of Search ................................ 340/442, 445, 340/447; 73/146.8, 146.2; 200/61.22

(56) References Cited

U.S. PATENT DOCUMENTS

| | | | |
|---|---|---|---|
| 4,334,215 A | 6/1982 | Frazier et al. | 340/539 |
| 4,823,107 A | 4/1989 | Pompier | 340/442 |
| 4,909,074 A | 3/1990 | Gerresheim et al. | 73/146.4 |
| 4,938,056 A | 7/1990 | DeRudder et al. | 73/49 |
| 4,970,904 A | * 11/1990 | Knotts | 73/863.86 |
| 4,998,092 A | 3/1991 | Ohno et al. | 340/445 |
| 5,050,110 A | 9/1991 | Rott | 364/557 |
| 5,081,443 A | 1/1992 | Breit | 340/426 |
| 5,193,387 A | 3/1993 | Hodate | 73/146.5 |
| 5,228,337 A | 7/1993 | Sharpe et al. | 73/146.5 |
| 5,230,243 A | 7/1993 | Reincke | 73/146.3 |
| 5,231,872 A | 8/1993 | Bowler et al. | 73/146.5 |
| 5,249,609 A | 10/1993 | Walker et al. | 141/4 |
| 5,335,540 A | 8/1994 | Bowler et al. | 73/146.5 |
| 5,452,608 A | 9/1995 | Green | 73/146.8 |
| 5,460,037 A | 10/1995 | Chamussy et al. | 73/146.3 |
| 5,483,826 A | 1/1996 | Schultz et al. | 73/146.5 |
| 5,483,827 A | 1/1996 | Kulka et al. | 73/146.5 |
| 5,493,925 A | 2/1996 | Liegel et al. | 73/866.5 |
| 5,569,848 A | 10/1996 | Sharp | 73/146.2 |
| 5,604,481 A | * 2/1997 | Lin | 340/442 |
| 5,774,048 A | 6/1998 | Achterholt | 340/447 |

\* cited by examiner

*Primary Examiner*—Daryl C. Pope
(74) *Attorney, Agent, or Firm*—Stoel Rives LLP

(57) ABSTRACT

A tire pressure and temperature measurement system (100) includes an oxygen sensing subsystem (140) that detects the oxygen concentration in the tire and presents an alarm condition (152) indicative of a potentially hazardous inflation gas mixture. The oxygen sensing subsystem is mounted on or within the tire and may be implemented standalone or as a part of the temperature and pressure system. A "go no-go" indication is telemetered to the truck operator or to a remote measurement system (80) for monitoring and initiation of corrective action.

21 Claims, 5 Drawing Sheets

TIRE INFLATION GAS TEMPERATURE, PRESSURE, AND OXYGEN MONITORING SYSTEM

RELATED APPLICATIONS

This application is a continuation-in-part of application Ser. No. 09/330,534, filed Jun. 11, 1999 now U.S. Pat. No. 6,292,095, which is a continuation-in-part of application Ser. No. 09/038,761, filed Mar. 11, 1998 for OFF-THE-ROAD TIRE TEMPERATURE AND PRESSURE MONITORING SYSTEM, now U.S. Pat. No. 6,025,777.

TECHNICAL FIELD

This invention relates to pressure, temperature, and oxygen measurements and more particularly to systems for measuring truck and mining tire inflation gas oxygen concentrations, temperatures, and pressures and for predicting inflation pressure changes required to achieve targeted operating pressures.

BACKGROUND OF THE INVENTION

Giant off-the-road tires, particularly those employed by earth moving and mining ore vehicles, are subjected to very heavy loads that make them susceptible to premature failure unless proper inflation gas pressures are maintained. Such tires are even subject to dangerous explosive failure if the inflation gas includes an oxygen concentration exceeding certain limits. For this reason, many mine truck operators are now using dry nitrogen as an inflation gas. Even so, trapped gases, air leaks, hydrocarbon out-gassing, and osmosis can cause a dangerous oxygen buildup inside the tires.

FIG. 1 represents a mining ore truck 10, which can weigh up to 550 tons when loaded and carries its heavy loads on only two axles. A front axle 12 has two single tires 14 mounted thereon and a rear axle 16 has two dual tires 18 (only one "dual" shown) mounted thereon, resulting in loads of about 50 tons per tire. A typical tire is inflated through a conventional valve stem 20 (only two shown) to an operating pressure ranging from about 85 to 185 pounds per square inch of gauge pressure ("psig") and, when operating, may have an operating temperature ranging from about 100 to 255 degrees Fahrenheit ("° F."). If the tire pressure is too high, a failure mode (explosion) may occur. However, if the tire pressure is too low, the excess heat generated may cause separation of some of the 18 to 22 tire layers after as few as 300 hours of operation, whereas such tires normally have at least a 1,000 hour operating life. Giant off-the-road tires cost about $25,000 to $30,000 each, and vehicle downtime costs at least about $500 per hour. Clearly, maintaining proper tire operating pressure is an economic and safety imperative.

Unfortunately, conventional tire pressure measurement methods require allowing the tires to cool for about eight hours before an accurate tire pressure measurement and inflation pressure adjustment can be made. The resulting costly downtime often leads to infrequent tire pressure measurements. To make matters worse, tires inflated by conventional air compressors often add water vapor and compression heating of the inflation air, causing errors between the measured and operating air pressures in the tires. Of course, conventional compressed air also includes oxygen. Moreover, off-the-road vehicle operators often add fluids to tires to inhibit rim rust and scale that otherwise makes tire removal difficult. Also, new tires are stored outdoors where they can collect rainwater, some of which inevitably remains in the tire when it is installed on a vehicle. Unfortunately, such fluids have vapor pressures that contribute to pressure measurement errors. Tires operating under these conditions are referred to as "wet" tires. Finally, many off-the-road vehicles operate in cold climates but are maintained in heated facilities, further complicating the tire inflation pressure problem. Unfortunately, conventional gas law equations do not provide solutions to these problems.

There are previously known apparatus and methods for solving some of the above-described problems. In particular, U.S. Pat. No. 5,452,608 for PRESSURE AND TEMPERATURE MONITORING VEHICLE TIRE PROBE WITH RIM ANCHOR MOUNTING describes a tire rim mounted sensor probe and conductor terminal apparatus for sensing the air pressure and temperature inside a tire. When the vehicle stops, a conventional electronic measuring device is electrically connected to the conductor terminal to convert the sensor probe data into pressure and temperature measurements. Unfortunately, the sensor probe is separately mounted through a hole in the rim, a disadvantage that weakens the rim and requires a relatively expensive field retrofit to every rim. If a new rim is required, it similarly has to be retrofitted, adding to the downtime of vehicle. Of course, a tire cool down period may be required to obtain usable readings.

U.S. Pat. No. 5,335,540 for TIRE MONITORING APPARATUS AND METHOD describes a tire pressure and temperature sensing apparatus that employs radio telemetry to continuously monitor tire pressure and temperature while the vehicle is a operating. However, as in the above-described patent, the pressure and temperature sensing probe is separately mounted to the rim, which has many of the above-described disadvantages. Moreover, every vehicle must carry a telemeter receiver by which the vehicle driver monitors the tire operating pressures and temperatures.

There are many other patents describing tire pressure and temperature monitoring apparatuses and methods. Some describe sensors embedded in the tires, others describe wheel hub mounted slip rings for conducting sensor data to a vehicle data processor, and still others describe complex systems for inflating and deflating tires while the vehicle is operating. However, there is no known prior method or apparatus that measures oxygen concentration or accounts for pressure measurement errors caused by air compressors, water vapor pressure, and temperature changes.

What is needed, therefore, is an accurate tire pressure, temperature, and oxygen concentration measuring system that does not require a cool down time, does not require expensive retrofitting or weakening of tire rims, accounts for sources of measurement errors, is readily transferred among tires and vehicles, and is usable on a wide variety of tire and wheel combinations.

SUMMARY OF THE INVENTION

An object of this invention is, therefore, to provide an apparatus and a method for measuring tire pressure and predicting inflation pressure changes that account for many sources of measurement errors without requiring a tire cool down period.

Another object of this invention is to provide an apparatus and a method for measuring tire pressure and temperature without resorting to expensive retrofitting or weakening of tire rims.

A further object of this invention is to provide a tire pressure and temperature measuring apparatus and a method that is readily transferable among tires and vehicles and is usable with a wide variety of tire and rim combinations.

Yet another object of this invention is to provide an apparatus and a method for measuring oxygen concentration in the inflation gas of a tire.

A first embodiment of a tire pressure and temperature measurement system of this invention adapts a Y-block to an existing valve stem. One branch of the Y-block accepts a conventional valve core and the other branch of the Y-block accepts a flexible tubular temperature sensor that leads "down the throat" of the existing valve stem and into the interior of the tire. Making a measurement entails stopping the vehicle and, without a cool down period, attaching a pressure sensor to the conventional valve stem and attaching a hand-held processor to the pressure and temperature sensors. The hand-held processor reads the current tire pressure and temperature and executes a program that accounts for measured and target temperatures, vapor pressures, and gas compressibility and indicates how much pressure to add or subtract to the tire to achieve an accurate final tire operating pressure.

A second embodiment of the tire pressure and temperature measurement system employs a modified Y-block that adapts to an existing rim, angle adaptor, and extension hose of an inside dual tire. The modified Y-block receives an elongated temperature sensor with sufficient flexibility for feeding down the throat of the extension hose, bending around the corner of the angle adaptor, and protruding into the interior of the tire. Making a measurement is carried out as in the first embodiment.

A third embodiment of the tire pressure and temperature measurement system encloses pressure and temperature sensors and a battery powered telemetry transmitter inside a generally oblate protective housing, all of which is simply placed loosely within the interior of a tire when it is mounted to a rim. The telemetry transmitter battery capacity is sufficient for one year of continuous operation, which exceeds the expected tire life. In this embodiment, a telemetry receiver receives pressure and temperature data transmitted from inside the tire and conveys the data to a processor that executes the program described in the first embodiment. The telemetry receiver can be tuned to receive data from multiple tires while the vehicle is moving. Alternatively, the telemetry receiver can be adapted to receive data only from a closely adjacent tire.

A fourth embodiment of the tire pressure and temperature measurement system encloses the pressure and temperature sensors and the battery powered telemetry transmitter inside a protective U-shaped channel housing that is magnetically attached to the rim inside the tire. As in the third embodiment, the telemetry receiver receives pressure and temperature data transmitted from inside the tire and conveys the data to a processor that executes the program described in the first embodiment. The telemetry receiver can be tuned to receive data from multiple tires while the vehicle is moving. Alternatively, the telemetry receiver can be adapted to receive data only from a closely adjacent tire.

A fifth embodiment of this invention includes an oxygen sensing subsystem that detects the presence of oxygen in the tire interior and presents an alarm condition indicative of a potentially hazardous oxygen concentration. The oxygen sensing subsystem is mounted on or within the tire is preferably implemented as a part of the above described temperature and pressure monitoring embodiments. The oxygen sensing subsystem includes an oxygen sensor that generates an analog voltage corresponding to an oxygen concentration in the tire. A sensor amplifier conditions the oxygen sensor signal for presentation to a comparator that is coupled to a controller in the tire pressure and temperature measuring system. To conserve battery power, oxygen measurements are sampled on demand and/or pulsed on, sampled, and then turned off for a predetermined time period.

Additional objects and advantages of this invention will be apparent from the following detailed description of preferred embodiments thereof that proceed with reference to the accompanying drawings.

DETAILED DESCRIPTION OF PREFERRED EMBODIMENTS

Figure 2:
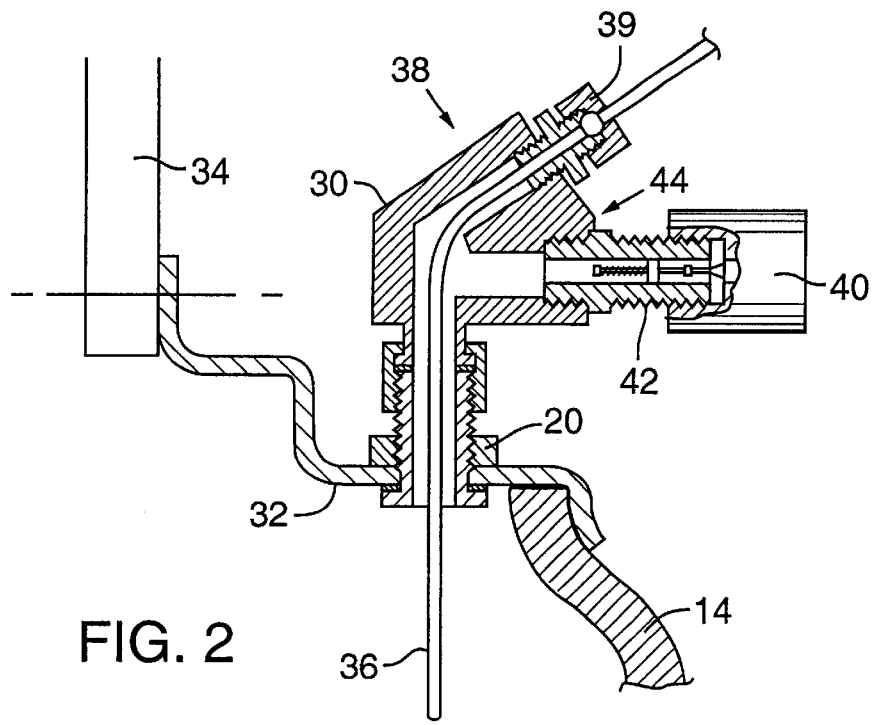
FIG. 2 is a sectional side elevation view of a first embodiment of a Y-block of this invention adapted to an existing rim and valve stem.

FIG. 2 shows a first embodiment of this invention in which a Y-block 30 is threaded onto existing valve stem 20, which is bolted in place on a wheel rim 32. Single tire 14 is mounted to wheel rim 32, which is attached to an axle hub 34 by multiple studs and nuts (not shown). The interior temperature of tire 18 is sensed by a temperature sensor 36, such as a thermocouple or thermistor that is inserted through a first branch 38 of Y-block 30, through existing valve stem 20, and into the interior of tire 14. A seal nut 39 that is threaded into first branch 38 secures temperature sensor 36 therein and prevents air from leaking out first branch 38.

Tire pressure is measured by attaching a pressure sensor 40 to a valve core 42 that is threaded into a second branch 44 of Y-block 30. Pressure sensor 40 is preferably an ECLIPSE model 9251702, manufactured by Data Instruments, Inc. of Acton, Mass. Conventional means are employed to connect, condition, and digitize the signals generated by temperature and pressure sensors 36 and 40. The digitized signals are processed as described with reference to the EXAMPLE herein to compute how much air pressure to add to, or subtract from, tire 14.

Preferably, temperature sensor 36, pressure sensor 40, and the associated connecting, signal conditioning, and digitizing circuitry are securely housed and mounted to rim 32, and a portable computer (not shown) is plugged into an interface port on the housing to compute how much pressure to add to, or subtract from, tire 14.

Figure 3:
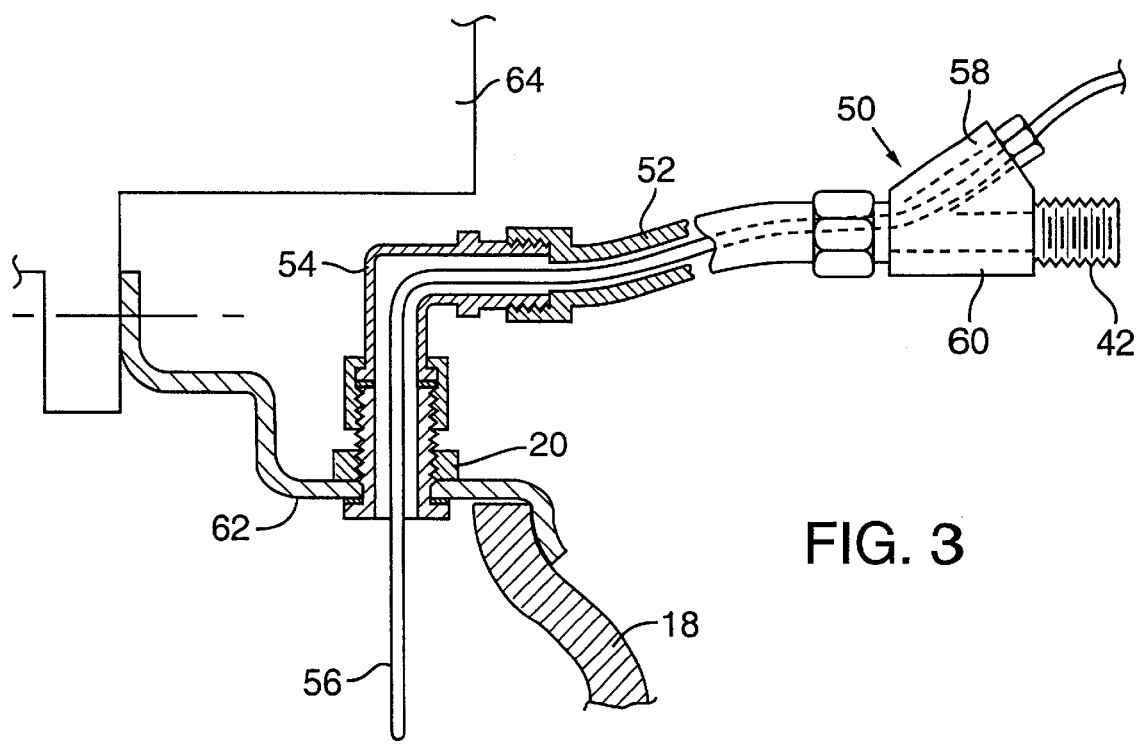
FIG. 3 is a sectional elevation view of a second embodiment of a Y-block of this invention adapted to an existing inside dual rim, valve stem, and extension hose.

FIG. 3 shows a second embodiment in which a Y-block 50 is connected to an extension hose 52 that connects through an elbow 54 to existing valve stem 20 on inside dual tire 18. This embodiment requires an elongated, flexible temperature sensor 56 to make a 90-degree bend before entering the tire. Preferably, a flexible thermocouple housed in a "speedometer cable-style" housing is sufficiently flexible-to traverse such bends while surviving the harsh environments of off-the-road vehicle tires.

As in the first embodiment, Y-block 50 has first and second branches 58 and 60 and is coupled to associated connecting, signal conditioning, and digitizing circuitry that are securely housed and mounted to rim 32. In this embodiment, however, inside dual tire 18 is mounted to an inside dual wheel rim 62, which is bolted in place on an inside dual axle hub 64.

Figure 4:
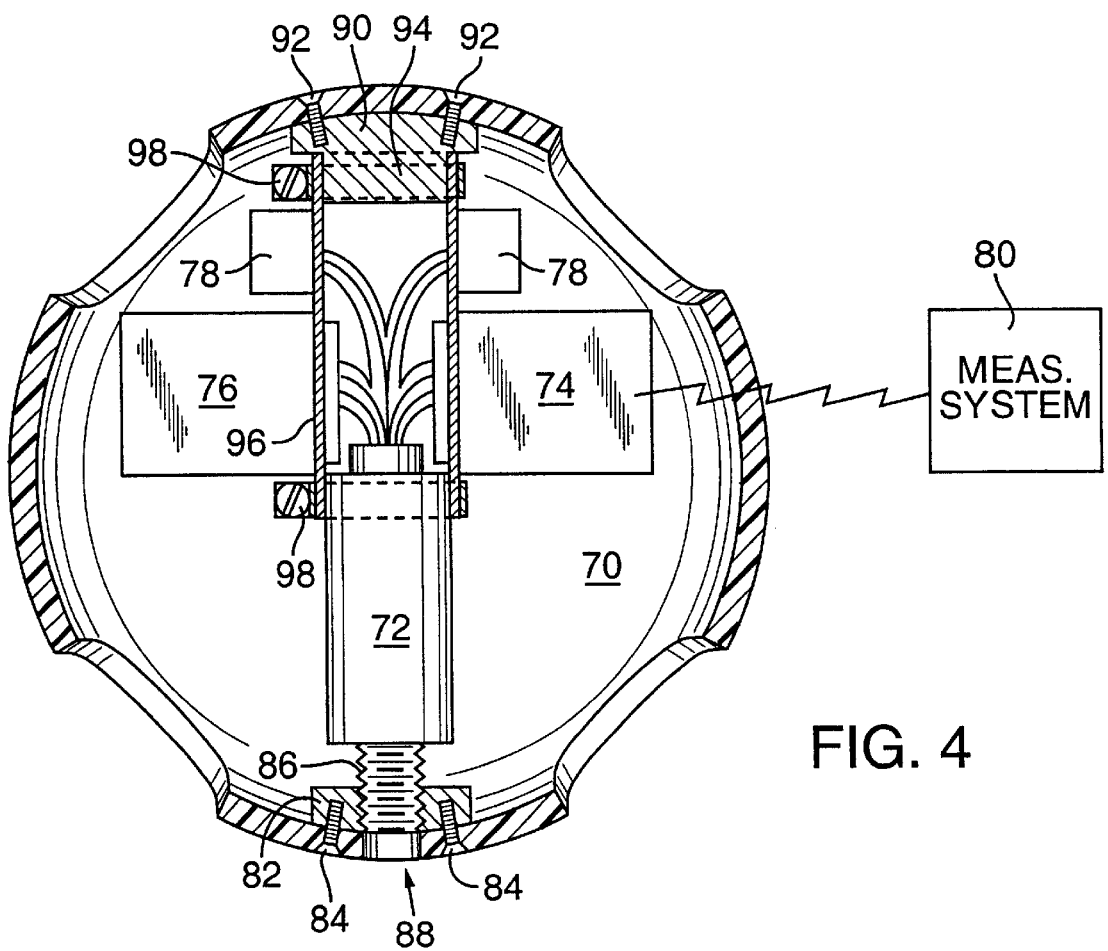
FIG. 4 is a sectional elevation view of a third embodiment of this invention showing pressure and temperature sensors and a battery powered telemetry transmitter enclosed within a spherical protective housing.

FIG. 4 shows a third embodiment of this invention in which a generally oblate spherical housing 70 encloses a pressure and temperature sensor 72, a data transceiver 74, a controller 76, and batteries 78, all of which are simply inserted loosely inside the tire when it is installed on the vehicle. Pressure and temperature sensor 72 is preferably a model PPT-R manufactured by Honeywell, Inc. of Plymouth, Minn. Pressure and temperature sensor 72 is housed within a 1.375 inch diameter, 3.65 inch long stainless steel cylinder having a data connector at one end and a ¼ inch NPT female pipe threaded sensor access hole at the other end. The model PPT-R includes signal conditioning, digitizing, and communicating electronics within its package.

Housing 70 may be shaped like a ball, a football, or any other suitable shape that will not damage the interior of the tire and protects the components inside housing 70. In a developmental prototype, housing 70 was a 10 inch diameter polypropelene ball having about a 0.187 inch wall thickness and six 4.0 inch diameter holes evenly distributed about its surface. Such a ball is available from pet stores as a ferret toy named the "Jolly Ball," which is manufactured by Jolly Pet, Inc. of Ravenna, Ohio. The holes are of a suitable size and distribution to allow assembly of the components inside housing 70. Of course, other housing constructions are possible including mated hemispheres, cages, blunted cylinders, tauruses, dumb-bell shapes, and inflatable shapes. Testing revealed that a 20 inch diameter housing is preferred to keep the antenna associated with transceiver 74 at least 10 inches off the tire floor, thereby increasing transmission efficiency through the tire side wall.

Sensed pressure and temperature data are telemetered by transceiver 74 to a remote measurement system 80 while the vehicle is in operation. Tire life can be significantly improved by remotely measuring tire pressure and temperature at the end of each ore-transporting run, computing in remote measurement system 80 any pressure changes required, and adjusting the tire pressure accordingly before the next run. The computing is carried out as described with reference to the EXAMPLE herein.

A two inch diameter, spherically faced first end cap 82 is attached by six screws 84 (only two shown) to the interior of housing 70. The spherical face has a radius of curvature chosen to match the inside radius of housing 70. The center of first end cap 82 is drilled and tapped with ¼ inch NPT female threads. A ¼ inch NPT male nipple 86 mechanically connects pressure and temperature sensor 72 and first end cap 82 and provides an opening between pressure and temperature sensor 72 and the air inside the tire.

A second end cap 90 having a similar spherical face is attached by six screws 92 (only two shown) to the side of housing 70 that is diametrically opposed to the first end cap mounting position. Second end cap 90 includes a cylindrical protrusion 94 that preferably has the same diameter as pressure and temperature sensor 72. An aluminum center tube 96 having slotted ends and an inside diameter chosen to fit snugly over the diameters of protrusion 94 and pressure and temperature sensor 72 extends between and is secured thereto by clamps 98 fitted around the slotted ends. Thereby, center tube 96, pressure and temperature sensor 72, and male nipple 86 form a rigid axle extending through the center of housing 70 with first and second end caps 82 and 90 acting as axle hubs. Pressure and temperature sensor 72, data transceiver 74, controller 76, and batteries 78 are all securely mounted to and interconnected through center tube 96.

Figure 5:
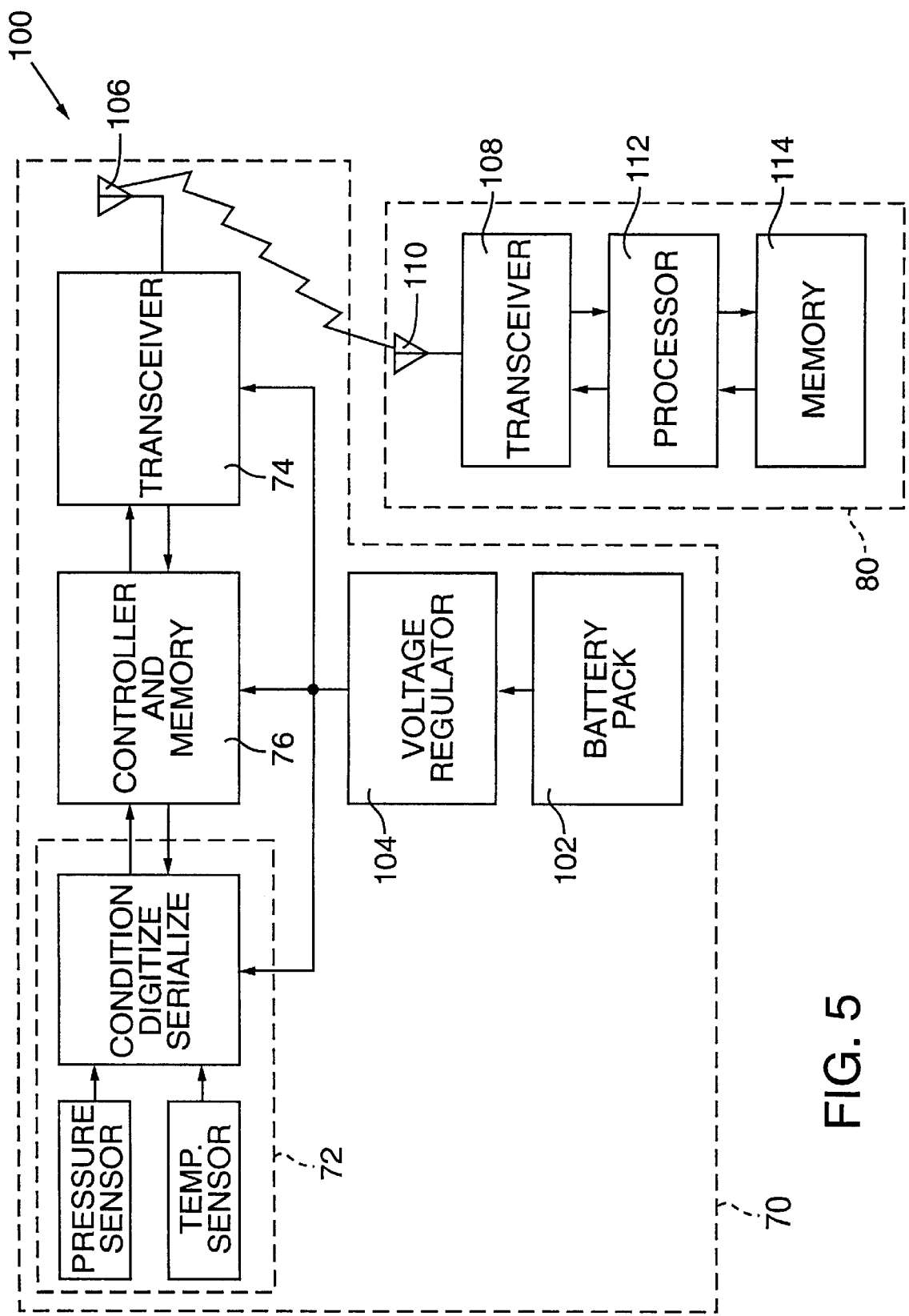
FIG. 5 is an electrical block diagram of a tire pressure and temperature measuring system based on the third and fourth embodiments of this invention.

FIG. 5 shows the interconnections among electronic subassemblies implementing a preferred tire pressure and temperature measuring system 100 of this invention, which employs the third embodiment described above with reference to FIG. 4. Housing 70 encloses pressure and temperature sensor 72, data transceiver 74, controller 76, a battery pack 102, and a voltage regulator 104.

Controller 76 preferably includes a model MC68HC 11 CMOS microprocessor that is manufactured by Motorola, Inc. located in Phoenix, Ariz. The microprocessor includes on chip random access memory and electrically erasable programmable read-only memory to support program memory and data transmission functions. Controller 76 intercommunicates with pressure and temperature sensor 72 through a model LT1180 differential logic driver/receiver (not shown), which is manufactured by Linear Technology Corporation of Milpitas, Calif. Pressure and temperature data received by controller 76 are transferred along with a data synchronization clock to data transceiver 74, which may be a MICROSTAMP 20M remote intelligent communications unit model MSEML256X10SG manufactured by MICRON Technology, Inc. located in Boise, Id. Data transceiver 74 includes an on chip 256 bit data memory and employs direct sequence spread spectrum transmission at a 2.44175 GHz center frequency. Reception employs a differential phase shift keyed modulated backscatter in the 2.400 to 2.4835 GHz band on a 596 kHz subcarrier. A simple circuit board "patch" antenna 106 permits a pair of such data transceivers and antenna to have a line of sight range of about 15 meters. A range greater than about 3 meters is suitable for communicating with remote measurement system 80 of this invention.

Alternatively and preferably, data transceiver 74 is a conventional 900 MHz data transceiver, such as ones employed in wireless telephones, with a flexible quarter wavelength vertical antenna.

The above-described circuits receive 5.5 to 6.0 volt DC power from voltage regulator 104, which is preferably a model LT1121 manufactured by Linear Technology Corporation of Milpitas, Calif. Voltage regulator 104 receives nominal 7.5 volt DC power from battery pack 102 that includes a group of six series connected batteries 78 (FIG. 4), which are preferably "super C" sized nickel-cadmium or lithium cells that are available from various manufacturers. Batteries 78 are evenly distributed around and clamped to center tube 96 near the end that is attached to second end cap 90. Because it employs on-demand burst data transmission, tire pressure and temperature measuring system 100 has a very low standby power drain, resulting in a typical battery lifetime of about one year when lithium batteries are employed.

Remote measurement system 80 includes a data transceiver 108 and a patch antenna 110 that are similar to and intercommunicate with data transceiver 74 and patch antenna 106. Data transceiver 108 intercommunicates with a processor 112, such as a conventional laptop personal computer that includes a memory 114. Because remote measurement system 80 is most suitably hand-held, processor 112 and memory 114 are preferably a model PC9000-A/D manufactured by DAP Technology Corporation of Tampa, Fla. Of course, a wide variety of PC types are usable including tower and desk top versions.

Figure 6:
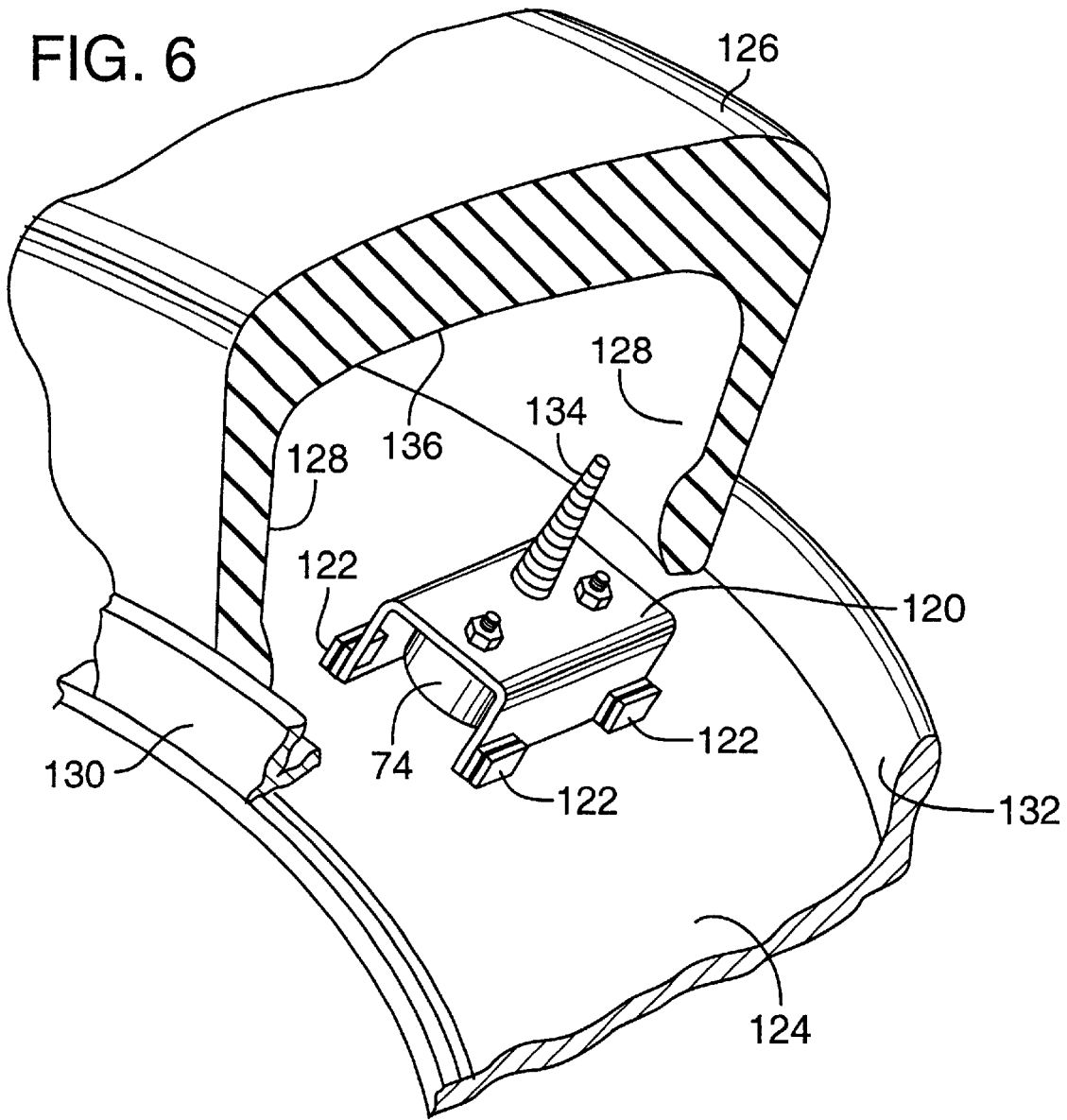
FIG. 6 is an isometric cutaway view of a fourth embodiment of this invention showing the pressure and temperature sensors and battery powered telemetry transmitter of FIG. 4 enclosed in a protective U-shaped channel housing that is magnetically attached to a tire rim.

FIG. 6 shows a fourth embodiment of this invention in which a generally U-shaped channel 120 encloses and provides mounting points for pressure and temperature sensor 72 (not shown), data transceiver 74, controller 76 (not shown), and batteries 78 (not shown). U-shaped channel 120 has at least one but preferably four magnets 122 attached to the terminal margins of its side flanges for magnetically clamping U-shaped channel 120 to a wheel 124 when a tire 126 is being installed on the vehicle. Magnets 122 may be selected from among various commercially available types, but preferably are those made from rare-earth and ceramic compositions and having pole pieces attached to each side that are shaped to mate to substantially flat surfaces. Field testing has shown that such magnets have sufficient flux density to firmly secure U-shaped channel 120 to wheel 124 under acceleration loading condition typically experienced by the vehicle. Optimal magnetic coupling of magnets 122 to wheel 124 is preferably attained by orienting the long axis of U-shaped channel 120 substantially parallel to the rotational axis of wheel 124 as shown in FIG. 6. Of course, U-shaped channel 120 is but one possible shape for implementing the invention.

Employing magnets 122 eliminates the need for drilling mounting holes in wheel 124 and, thereby, prevents weakening of wheel 124. U-shaped channel 120 preferably extends about 3.5 inches (8.9 cm) above wheel 124, including 0.75 inches (1.9 cm) for magnets 122, and is about 4 inches (10.2 cm) wide by 6 inches long (15.25 cm), which is a sufficiently volume to enclose pressure and temperature sensor 72, data transceiver 74, controller 76, and batteries 78 without touching interior side walls 128 of tire 126. Tire 126 is typically mounted between a flange 130 and a rim 132 that both extend from wheel 124.

The above-described magnetic mounting of U-shaped channel 120 to wheel 124 provides a sufficient separation of a flexible vertical antenna 134 from a floor 136 of tire 126 to provide adequate communications efficiency of data transceiver 74 through side walls 128 of tire 126. Flexible vertical antenna 134 preferably extends perpendicularly from the center member of U-shaped channel 120.

As in the third embodiment of this invention, sensed pressure and temperature data are telemetered by transceiver 74 to a remote measurement system 80 while the vehicle is in operation.

Figure 1:
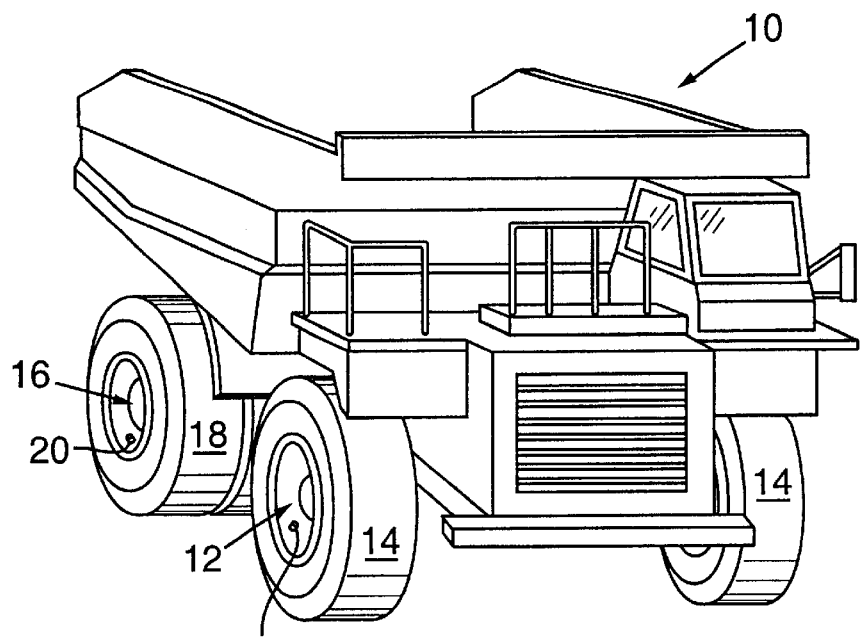
FIG. 1 is an isometric pictorial view of an exemplary prior art ore truck suitable for employing this invention.

In operation, a vehicle, such as mining ore truck 10 (FIG. 1), has a tire pressure and temperature measuring system 100 installed in each of tires 14 and 18. When ore mining truck 10 approaches remote measurement system 80, an operator commands processor 112 to interrogate each tire pressure and temperature measuring system 100 regarding the current pressure and temperature inside each of tires 14 and 18. Processor 112 conveys the command to data transceiver 108 that transmits in sequence an interrogation burst to each of data transceivers 74, which each in turn exit standby mode, retrieve from the memory of associated controller 76 the current pressure and temperature data received from pressure and temperature sensor 72, and transmit the retrieved data to remote measurement system 80.

Processor 112 stores in memory 114 the current pressure and temperature data associated with each of tires 14 and 18 and follows the process described below and with reference to FIG. 6 to accurately predict the tire pressure reading that would result if the tires were allowed to cool down to a predetermined temperature. If the predicted pressure at the predetermined temperature is outside an optimal inflation pressure range, mining ore truck 10 is stopped and its tire pressures adjusted accordingly.

The calculation process followed by processor 112 is based on equation (1), which expresses the relationships among the current and final temperatures, pressures, vapor pressures of water, and compressibility factors of a gas confined in a fixed volume.

Initial and Final Pressure Relationships:

$$P_2 = \frac{Z_2}{Z_1}(P_1 - P_{W1})\frac{T_2}{T_1} + P_{W2} \qquad \text{Eq. (1)}$$

where:
 $P_2$=Final (predicted) pressure (atm), from Eq. (6)
 $P_1$=Current (measured) pressure (atm), from Eq. (6)
 $T_2$=Final (target) temperature in degrees Rankine (° R)*, from Eq. (7)
 $T_1$=Current (measured) temperature (° R), from Eq. (7)
 $P_{W2}$=Water vapor pressure (atm) at temperature $T_2$, from Eqs. (2) and (5)
 $P_{W1}$=Water vapor pressure (atm) at temperature $T_1$, from Eqs. (2) and (5)
 $Z_2$=Gas compressibility at pressure $P_2$, from Eqs. (3) or (4)
 $Z_1$=Gas compressibility at pressure $P_1$, from Eqs. (3) or (4)

*The Rankine scale is the Fahrenheit-based absolute temperature scale just as the Kelvin scale is the Centigrade-based absolute temperature scale. Therefore, 180° R separate the freezing and steam points of water, whereas 100° K separate the freezing and steam points of water.

Because vapor pressures and compressibility factors Z are used to correct for non-ideal conditions, equation (1) does not rely on well-known ideal gas law equations known as Boyle's law and Charles' law. The vapor pressure relationships are described with reference to equation (2) and the compressibility factor relationships are described with reference to equations (3) and (4), which were statistically derived using nitrogen and air compressibility data published in Perry's Chemical Engineers' Handbook, 4th and 6th editions.

Moreover, because the compressibility factors depend on the final pressure and temperature, equation (1) is used twice to calculate an accurate final pressure. Equation (1) is first used to calculate a trial final pressure assuming that $Z_1$ equals $Z_2$. Then, using the trial final pressure, values for $Z_1$ and $Z_2$ are calculated. Then, equation (1) is used the second time to calculate an accurate final pressure value. An example calculation process is described later.

As mentioned above, equation (1) includes vapor pressure corrections $P_{W1}$ and $P_{W2}$ for wet tires. Equation (2) is used to calculate the vapor pressure of water at the current and final temperatures. Vapor pressure correction of equation (1) is necessary when a tire encloses sufficient water for saturation, which occurs if any liquid water is present at the warmer operating temperature; that is, not all of the water is vaporized. At the colder temperature, saturation occurs when the volume of liquid water is only about 0.5% of the total enclosed tire volume.

Vapor pressure of water:

$$P_W = e^{11.113 - \frac{6369.6}{T-360}} \qquad (2)$$

where: $P_W$ is the partial pressure in (atm) of water and T is the tire interior air temperature in ° F.

Equation (2) was derived by employing statistical regression. Table 1 shows a calculated (using equation 2) vapor pressures.

TABLE 1

| Temp | Vapor Pressure | | |
|---|---|---|---|
| ° F. | psia | Calc. | % Error |
| 20 | 0.050 | 0.052 | 2.58 |
| 30 | 0.081 | 0.080 | −1.58 |
| 40 | 0.122 | 0.120 | −1.70 |
| 50 | 0.178 | 0.176 | −0.90 |
| 60 | 0.256 | 0.255 | −0.29 |
| 70 | 0.363 | 0.363 | 0.15 |
| 80 | 0.507 | 0.509 | 0.41 |
| 90 | 0.698 | 0.702 | 0.55 |
| 100 | 0.949 | 0.955 | 0.63 |
| 110 | 1.274 | 1.282 | 0.61 |
| 120 | 1.692 | 1.700 | 0.47 |
| 130 | 2.221 | 2.229 | 0.35 |
| 140 | 2.887 | 2.890 | 0.12 |
| 150 | 3.716 | 3.711 | −0.14 |
| 160 | 4.739 | 4.718 | −0.44 |
| 170 | 5.99 | 5.945 | −0.76 |

The maximum relative error is 2.58% at 20° F, which error is less than 0.002 psi (the percentage error multiplied by the vapor pressure of the water). The 0.002 psi error is very small compared to typical tire operating pressures over 100 psi. The maximum absolute error using equation (2) is 0.046 psi at 170° F., which is still less than 0.05% of the typical tire operating pressure.

As mentioned above, equation (1) employs compressibility factors Z to correct the pressure, volume, and temperature relationships of real gases. Equations (3) and (4) express the compressibility factors Z for air and nitrogen respectively and were statistically obtained from actual data, rather than using generalized charts. The resultant equations are:

Compressibility factor Z of air:

$$Z = 0.99980 + 0.0025335 \times P - \frac{1.5303 \times P}{T} \qquad (3)$$

Compressibility factor Z of nitrogen:

$$Z = 0.99979 + 0.0074727 \times P - \frac{2.7270 \times P}{T} - 4.7453^{-6} \times P \times T \qquad (4)$$

where: Z equals the compressibility factor for nitrogen or air, P equals the pressure in atmospheres (atm), and T equals the temperature in ° R.

The comparisons of measured and calculated data and the relative errors resulting from using equations (3) and (4) are shown below in respective Tables 2 and 3.

TABLE 2

Air Compressibility

| Temp ° F. | Pressure psig | Z | Z | % Error |
|---|---|---|---|---|
| −10 | 44 | 0.9963 | 0.9963 | −0.00 |
| −10 | 58 | 0.9957 | 0.9955 | 0.02 |
| −10 | 88 | 0.9935 | 0.9937 | −0.02 |
| −10 | 130 | 0.9911 | 0.9912 | −0.01 |
| −10 | 132 | 0.9908 | 0.9911 | −0.03 |
| −10 | 275 | 0.9822 | 0.9827 | −0.05 |
| 80 | 44 | 0.9988 | 0.9986 | 0.02 |
| 80 | 58 | 0.9987 | 0.9983 | 0.04 |
| 80 | 88 | 0.9980 | 0.9977 | 0.03 |
| 80 | 130 | 0.9974 | 0.9968 | 0.06 |
| 80 | 132 | 0.9972 | 0.9968 | 0.04 |
| 80 | 275 | 0.9950 | 0.9939 | 0.11 |
| 170 | 44 | 1.0001 | 1.0002 | −0.01 |
| 170 | 58 | 1.0002 | 1.0003 | −0.01 |
| 170 | 88 | 1.0002 | 1.0005 | −0.03 |
| 170 | 130 | 1.0004 | 1.0008 | −0.04 |
| 170 | 132 | 1.0004 | 1.0008 | −0.04 |
| 170 | 275 | 1.0014 | 1.0019 | −0.05 |

TABLE 3

Nitrogen Compressibility

| Temp ° F. | Pressure psig | Z | Z | % Error |
|---|---|---|---|---|
| −10 | −0 | 0.9992 | 0.9991 | −0.01 |
| −10 | 58 | 0.9960 | 0.9962 | 0.02 |
| −10 | 130 | 0.9924 | 0.9927 | 0.03 |
| −10 | 275 | 0.9857 | 0.9855 | −0.02 |
| 80 | −0 | 0.9998 | 0.9996 | −0.02 |
| 80 | 58 | 0.9990 | 0.9991 | 0.01 |
| 80 | 130 | 0.9983 | 0.9984 | 0.01 |
| 80 | 275 | 0.9971 | 0.997 | −0.01 |
| 170 | −0 | 1.0001 | 0.9999 | −0.02 |
| 170 | 58 | 1.0007 | 1.0006 | −0.01 |
| 170 | 130 | 1.0011 | 1.0013 | 0.02 |
| 170 | 275 | 1.0029 | 1.0028 | −0.01 |

Tables 2 and 3 show that comparing the calculated compressibility values and actual data results in suitably low errors for both gases of less than 0.06%.

The following equations are used to convert between commonly used pressure and temperature units.

Pressure Unit Conversion: $P(\text{psig}) = [P(\text{atm}) - 1] \times 14.696$ (5)

Pressure Unit Conversion:

$$P(\text{atmosphere}) = \frac{P(\text{psia})}{14.696} \qquad (6)$$

Temperature Unit Conversion: $T(° F.) = T(° R) - 460$ (7)

As described in the following example, processor 112 employs equations (1) through (7) to accurately predict a tire pressure that would result were the tire allowed to cool from a current temperature to a final temperature.

EXAMPLE

Tire pressure and temperature measuring system 100 and remote measurement system 80 determine that an operating wet tire has a measured 140 psig current air pressure and a measured 125° F. current air temperature. A system operator needs to know what the tire pressure would be if it was allowed to cool to 40° F. The applicable steps and example calculations are set forth below with relevant variables underlined.

In a first step, processor 112 computes water vapor pressure at 125° F. and 40° F. using equation (2):

$$P_{W1}=e\char`\^\{11.113-6369/(\underline{125}+360)\}=0.13279\ atm$$

$$P_{W2}=e\char`\^\{11.113-6369/(\underline{40}+360)\}=0.00815\ atm$$

In a second step, processor 112 converts the current pressure measurement $P_1$ psig units to atm units using equation (5):

$$\underline{140}psig=\{P_1(atm)-1\}\times 14.696$$

Solving for $P_1$(atm) yields:

$$P_1(atm)=140/14.696+1=10.526\ atm$$

In a third step, processor 112 converts ° F. units to ° R units using equation (7):

$$T_1\degree\ R=\underline{125}\degree\ F.+460=585\degree\ R$$

$$T_2\degree\ R=\underline{40}\degree\ F.+460=500\degree\ R$$

In a fourth step, processor 112 sets the ratio $Z_2/Z_1$ equal to one and computes a trial pressure $P_2$ using equation (1):

$$\text{Trial }P_2=(1/1)\times(10.526-0.13279)\times(500/585)+0.00815=8.8916\ atm$$

In a fifth step, processor 112 computes $Z_2$ and $Z_1$ using equation (3) and the trial $P_2$. Equation (4) would be used if the system operator specified that the tire was filled with nitrogen rather than air:

$$Z_1=0.99980+0.0025335\times 10.526-1.5303/585\times 10.526=0.99894$$

$$Z_2=0.99980+0.0025335\times 8.8916-1.5303/500\times 8.8916=0.99511$$

In a sixth step, processor 112 computes a final $P_2$(atm) by recalculating equation (1) with the calculated values of $Z_2$ and $Z_1$:

$$P_2=(0.99511/0.99894)(10.526-0.13279)(500/585)+0.00815=8.8575\ atm$$

In a seventh step, processor 112 converts final $P_2$ psi atmosphere units to $P_2$ psi gauge units using equation (5):

$$P_2(psig)=(8.875-1)14.696=115.47\ psig$$

End of EXAMPLE.

Because the temperature sensors of this invention sense the temperature of the air contained in a tire, the same general process may also be employed to determine temperature adjustments cause by compression heating, expansion cooling (as the compressed air enters the tire), tire casing temperature caused by outside storage, and hot wheel and drum resident heat.

For example, an ambient inflation adjustment ("AIA") may be calculated for the original inflation of a newly installed tire or the reinstallation of a used tire. When using equation (1) to calculate the AIA, $T_1$ is the ambient outside air temperature (or the working environment temperature), and $T_2$ is the temperature of the compressed air used to inflate the tire (in this example, the temperature of a heated maintenance facility). Assume a 40.00×57 tire has a cold inflation pressure specification of 110 psig at 65° F. The tire is inflated inside a 65° F. maintenance facility, whereas its operating environment temperature will be 0° F. Using equations (1) through (7) reveals that the tire must be inflated to 128 psig at 65° F. if it is to achieve a 110 psig operating pressure after cooling to 0° F.

When using equation (1) as a prediction formula, $T_1$ is redefined as the original inflation air temperature inside the tire, $T_2$ is the currently measured air temperature inside the tire, and $P_1$ is the original inflation air pressure inside the tire. Equations (1) through (7) are used to calculate $P_2$, the current air pressure inside the tire. $P_2$ is used as a baseline pressure that is compared with the currently measured pressure reading to determine whether to increase, decrease, or maintain the current pressure inside the tire.

As described in the background of this invention, tires, particularly those employed by earth moving and mining ore vehicles, are subjected to very heavy loads that make them susceptible to premature failure unless proper inflation gas pressures are maintained. Such tires are even subject to dangerous explosive failure if the inflation gas includes an oxygen concentration exceeding certain limits. For this reason, many mine truck operators are now using dry nitrogen as an inflation gas. Even so, trapped gases, air leaks, hydrocarbon out-gassing, and osmosis can cause a dangerous oxygen buildup inside the tires. While the oxygen buildup problem is not readily solvable, the above-described tire temperature and pressure measuring system can be adapted to detect such dangerous oxygen buildup so it can be corrected before an explosive concentration accumulates.

Figure 7:
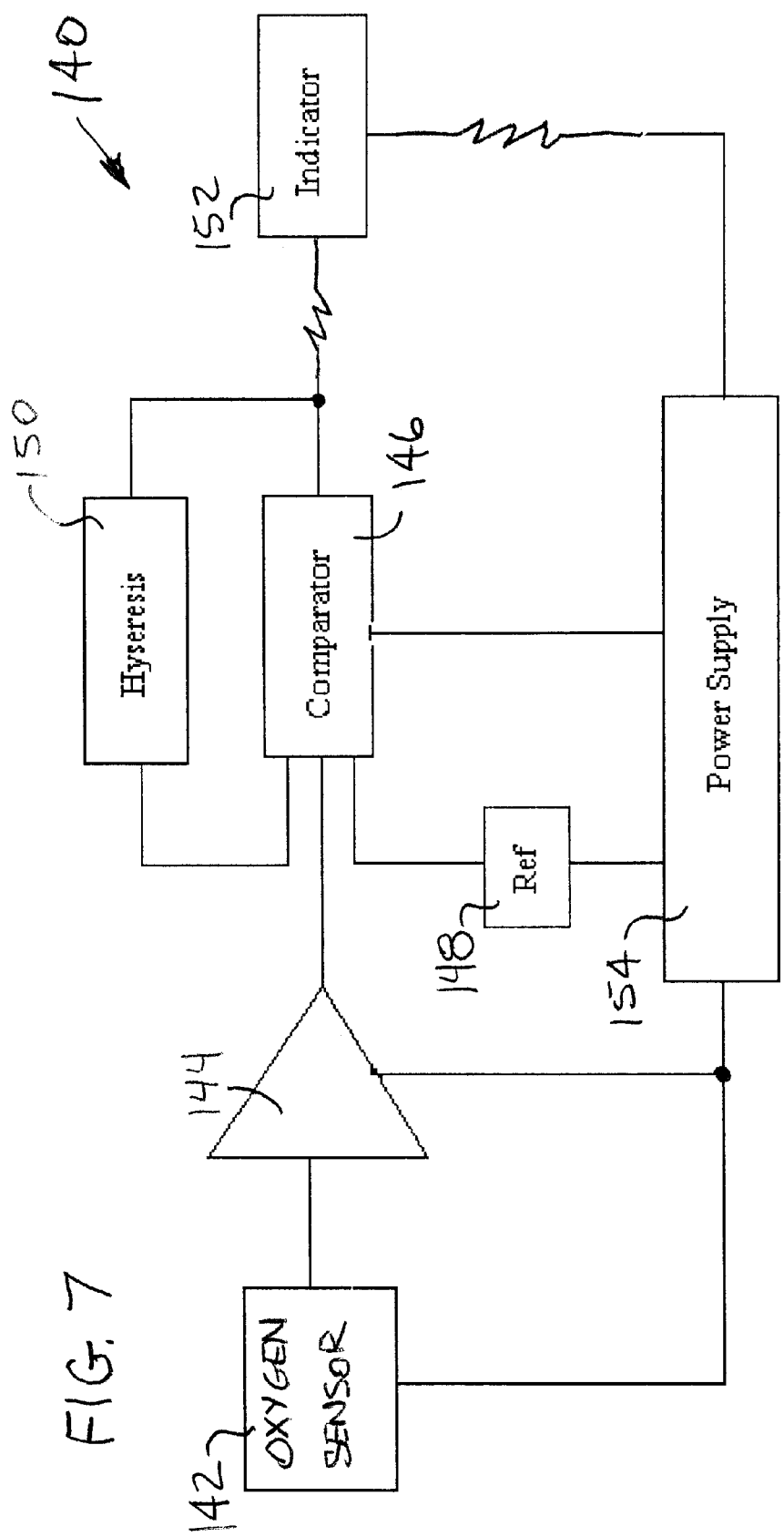
FIG. 7 is a simplified electrical block diagram of an oxygen sensing sub-system of this invention.

FIG. 7 shows a fifth embodiment of this invention in which an oxygen sensing subsystem 140 detects the presence of oxygen in the tire interior and presents an alarm condition indicative of a potentially hazardous oxygen concentration. Oxygen concentrations of 3% and above are considered hazardous.

Oxygen sensing subsystem 140 is mounted on or preferably within the tire and, therefore, must be able to withstand the above-described tire operating temperatures and pressures. Subsystem 140 is preferably implemented as a part of the above described temperature and pressure monitoring embodiments, but may be implemented as a standalone oxygen sensing embodiment. In its simplest form, oxygen sensing subsystem 140 includes a simple "go no-go" indication that is telemetered or otherwise communicated to the truck operator or remote measurement system 80 of FIGS. 4 and 5. However, in a preferred embodiment, tire interior oxygen concentration values are processed by measuring system 100 and telemetered to remote measurement system 80 for monitoring and initiation of corrective action.

Oxygen sensing subsystem 140 includes an oxygen sensor 142 that generates an analog voltage ranging from about 0.0 volt to about 1.0 volt corresponding to an oxygen concentration ranging from about 0% to about 100% respectively. Oxygen sensor 142 is preferably a model Pm1111E701 Paramagnetic Oxygen Transducer manufactured by Servomex Transducers, Norwood, Mass. Oxygen sensor 142 has a response time of less than 3 seconds and a sensitivity and repeatability better than 3%, which equates to a voltage sensitivity and repeatability of 30 millivolts.

A sensor amplifier 144 conditions the 0.0 volt to 1.0 volt oxygen sensor signal such that a 30 millivolt signal is amplified (minimum gain of 84) to about 2.5 volts for presentation to a conventional comparator 146. A conventional reference supply 148 provides a 2.5 volt reference signal to comparator 146. A hysteresis loop 150 introduces about 10% hysteresis into comparator 146 to ensure a high noise immunity and an effecting latching of any sensed alarm condition. The gain of sensor amplifier 144 is preferably set slightly higher, to about 100, to compensate for a threshold error caused by the hysteresis.

An optional alarm status indicator 152 includes, in its simplest form, of a light emitting diode that is mounted in-sight of the truck operator and coupled by telemeter, slip rings, or electromagnetic coupling to comparator 146. Alternatively and preferably, however, comparator 146 is coupled to controller 76 of tire pressure and temperature measuring system 100 (FIG. 5).

Oxygen sensing subsystem 140 is powered by a 5- to 6-volt power supply 154, which is preferably driven by battery pack 102 (FIG. 5). Oxygen sensor 142 requires about 65 milliamps of operating current while taking an oxygen measurement. Therefore, to conserve battery pack 102 power, power supply 154 is pulsed on for at least three seconds and the resulting oxygen concentration is sampled by tire pressure and temperature measuring system 100, after which power supply 154 is turned off for a predetermined time period, preferably about 10 minutes. Because oxygen buildup is typically a slow process, even longer times between measurements could be employed. Alternatively, power supply 154 can be pulsed on in response to the above-described on-demand burst data transmission mode employed by tire pressure and temperature measuring system 100. Of course, a combination of timed and on-demand operation can be employed as safety and operational conditions dictate.

Skilled workers will recognize that portions of this invention may be implemented differently from the implementations described above for preferred embodiments. For example, processor 112 could employ lookup tables stored in memory 114 to fetch precalculated values usable in many of the steps set forth above. This would be particularly useful for rapidly retrieving values in the vapor pressure and unit conversion steps. It is also conceivable that some or all of the steps could be performed by the processor in controller 76 upon receipt of an interrogation command that included a final temperature value.

Of course, skilled workers will understand how to use a wide variety of programming languages and computer types to implement the invention. Likewise, the invention may be implemented with other than the sensors, batteries, and electronic and mechanical components described above. For example, the data transceivers may employ other frequencies and modulation types or may be deleted in favor of a device that employs inductive or capacitive coupling directly through the tire. In the latter alternative, the vehicle may need to be stopped and the device held against the tire.

Also, in addition to taking on a variety of shapes and constructions, housing 70 need not be loosely enclosed within a tire, but may be bonded or otherwise attached to the tire or wheel without weakening them, or slung from the wheel inside the tire interior to increase the height of patch antenna 106 off the tire floor. The magnetic attachment embodiment may further include a safety sling to capture the housing or prevent detachment of the housing from the wheel. Range may also be increased by making patch antenna 110 a directional antenna with gain. Of course, many different antenna designs would be effective for either transceiver depending on the particular application. Likewise the invention can be adapted to work with many different tire shapes, sizes, and applications including automobile, aircraft, and truck tires.

It will be obvious to those having skill in the art that many changes may be made to the details of the above-described embodiments of this invention without departing from the underlying principles thereof. Accordingly, it will be appreciated that this invention is also applicable to oxygen concentration and inflation gas pressure and temperature measuring and predicting applications other than those found in the inflation of heavy truck tires. The scope of the present invention should, therefore, be determined only by the following claims.

What is claimed is:

1. An apparatus for detecting potentially hazardous inflation gas conditions in a tire inflated substantially with nitrogen, comprising:
    an oxygen sensor sensing an oxygen concentration in the interior of the tire;
    an electrical circuit generating a signal when the oxygen concentration exceeds a predetermined value indicative of a potentially hazardous inflation gas condition;
    an indicator responsive to the signal indicating when the oxygen concentration exceeds the predetermined value; and
    a battery powered power supply that activates at least one of the oxygen sensor and the electrical circuit for at least about three seconds and deactivates at least one of the oxygen sensor and the electrical circuit for substantially longer than about three seconds.

2. The apparatus of claim 1 in which the tire is an off-the-road vehicle tire.

3. The apparatus of claim 1 in which the predetermined value corresponds to an oxygen concentration of about 3 percent.

4. The apparatus of claim 1 in which the electrical circuit includes a threshold detector.

5. The apparatus of claim 4 in which the threshold detector further includes a hysteresis loop for increasing a noise immunity of the threshold detector and effectively latching the signal.

6. The apparatus of claim 1 in which the electrical circuit further includes a transmitter conveying data indicative of the oxygen concentration, and the indicator further includes a receiver receiving the data indicative of the oxygen concentration.

7. The apparatus of claim 6 in which the receiver is associated with a measurement system that is separated by a distance from the tire.

8. The apparatus of claim 1 further including a temperature sensor and a pressure sensor for sensing a current temperature and a current pressure of the inflation gas in the interior of the tire.

9. The apparatus of claim 8 in which the electrical circuit further includes a transmitter conveying data indicative of the current temperature and the current pressure of the inflation gas, and the indicator further includes a receiver receiving the data indicative of the current temperature and the current pressure of the inflation gas inside the tire.

10. The apparatus of claim 9 further including a processor coupled to the receiver, in which the processor processes the data indicative of the current pressure and the current temperature of the inflation gas in the interior of the tire to generate for a predetermined future temperature of the inflation gas in the interior of the tire an accurate prediction of a future pressure of the inflation gas in the interior of the tire.

11. A method for detecting potentially hazardous inflation gas conditions in a tire inflated substantially with nitrogen, comprising:
    sensing an oxygen concentration in the interior of the tire;
    generating a signal when the oxygen concentration exceeds a predetermined value indicative of a potentially hazardous inflation gas condition;
    indicating in response to the signal when the oxygen concentration exceeds the predetermined value; and activating at least one of the sensing and generating steps for at least about three seconds and deactivating at least one of the sensing and generating steps for substantially longer than about three seconds.

12. The method of claim 11 in which the tire is an off-the-road vehicle tire.

13. The method of claim 11 in which the predetermined value corresponds to an oxygen concentration of about 3 percent.

14. The method of claim 11 in which generating the signal includes threshold detecting the oxygen concentration.

15. The method of claim 11 in which the generating further includes transmitting data indicative of the oxygen concentration, and the indicating further includes receiving the data indicative of the oxygen concentration.

16. The method of claim 15 in which the receiving is associated with a measuring system that is separated by a distance from the tire.

17. The method of claim 11 further including sensing a current temperature and a current pressure of the inflation gas in the interior of the tire.

18. The method of claim 17 further including transmitting data indicative of the current temperature and the current pressure of the inflation gas, and receiving at a distance separated from the tire the data indicative of the current temperature and the current pressure of the inflation gas inside the tire.

19. The method of claim 18 further including processing the data indicative of the current pressure and the current temperature of the inflation gas in the interior of the tire and generating for a predetermined future temperature of the inflation gas in the interior of the tire an accurate prediction of a future pressure of the inflation gas in the interior of the tire.

20. An apparatus for detecting potentially hazardous inflation gas conditions in a tire inflated substantially with nitrogen, comprising:

an oxygen sensor sensing an oxygen concentration in the interior of the tire;

an electrical circuit generating a signal representing the oxygen concentration in the interior of the tire;

a temperature sensor and a pressure sensor for sensing a current temperature and a current pressure of the inflation gas in the interior of the tire;

a transmitter conveying the signal and data indicative of the current temperature and the current pressure of the inflation gas;

a receiver receiving the signal and the data indicative of the current temperature and the current pressure of the inflation gas inside the tire;

an indicator responsive to the signal indicating when the oxygen concentration exceeds a predetermined value indicative of a potentially hazardous inflation gas condition; and a processor coupled to the receiver, in which the processor processes the data indicative of the current pressure and the current temperature of the inflation gas in the interior of the tire to generate for a predetermined future temperature of the inflation gas in the interior of the tire an accurate prediction of a future pressure of the inflation gas in the interior of the tire.

21. A method for detecting potentially hazardous inflation gas conditions in a tire inflated substantially with nitrogen, comprising:

sensing an oxygen concentration in the interior of the tire;

generating a signal representing the oxygen concentration in the interior of the tire;

sensing a current temperature and a current pressure of the inflation gas in the interior of the tire;

transmitting the signal and data indicative of the current temperature and the current pressure of the inflation gas;

receiving at a distance separated from the tire the signal and the data indicative of the current temperature and the current pressure of the inflation gas inside the tire;

indicating in response to the signal when the oxygen concentration exceeds a predetermined value indicative of a potentially hazardous inflation gas condition; and processing the data indicative of the current pressure and the current temperature of the inflation gas in the interior of the tire and generating for a predetermined future temperature of the inflation gas in the interior of the tire an accurate prediction of a future pressure of the inflation gas in the interior of the tire.

* * * * *

UNITED STATES PATENT AND TRADEMARK OFFICE
CERTIFICATE OF CORRECTION

PATENT NO. : 6,486,771 B1  
DATED : November 26, 2002  
INVENTOR(S) : Timothy C. Fuller, Melvin M. Priday and Max E. Butz It is certified that error appears in the above-identified patent and that said Letters Patent is hereby corrected as shown below:

Column 2,
Line 29, reads "is a operating.", but should read -- is operating. --.

Column 9,
Line 3, reads $P_W = e^{11.113 - \frac{6369.6}{T-360}}$, but should read $-- P_W = e^{11.113 - \frac{6369.6}{T+360}}$ --.

Line 11 reads, "shows a calculated", but should read -- shows a comparison of measured and calculated --.

Column 11,
Line 3, reads, "underlined", but should read -- underlined --.
Line 7, reads, "PW1 = e^{11.113-6369/(125+360)} = 0.13279 atm", but should read -- PW1 = e^{11.113-6369/(125+360)} = 0.13279 atm --.
Line 9, reads, "PW2 = e^{11.113-6369/(40+360)} = 0.00815 atm", but should read -- PW2 = e^{11.113-6369/(40+360)} = 0.00815 atm --.
Line 15, reads, "140 psig = {P1(atm)-1} x 14.696", but should read -- 140 psig = {P1(atm)-1} x 14.696 --.
Line 18, reads, "P1(atm) = 140/14.696+1 = 10.526 atm", but should read -- P1(atm) = 140/14.696+1 = 10.526 atm --.
Line 22, reads, "T1ºR = 125ºF+460 = 585ºR", but should read -- T1ºR = 125ºF+460 = 585ºR --.
Line 28, reads, "Trial P2 = (1/1) x (10.526-0.13279) x (500/585)+0.00815 = 8.8916 atm", but should read -- Trial P2 = (1/1) x (10.526-0.13279) x (500/585)+0.00815 = 8.8916 atm --.
Line 35, reads "Z1 = 0.99980+0.0025335 x 10.526-1.5303/585 x 10.526 = 0.99894", but should read -- Z1 = 0.99980+0.0025335 x 10.526-1.5303/585 x 10.526 = 0.99894 --.
Line 36, reads, "Z2 = 0.99980+0.0025335 x 8.8916-1.5303/500 x 8.8916 = 0.99511", but should read -- Z2 = 0.99980+0.0025335 x 8.8916-1.5303/500 x 8.8916 = 0.99511 --.
Line 42, reads, "P2 = (0.99511/0.99894)(10.526-0.13279)(500/585)+0.00815 = 8.8575 atm", but should read -- P2 = (0.99511/0.99894)(10.526-0.13279)(500/585)+0.00815 = 8.8575 atm", but should read -- P2 = (0.99511/0.99894)(10.526-0.13279)(500/585) +0.00815 = 8.8575 atm --.

UNITED STATES PATENT AND TRADEMARK OFFICE
CERTIFICATE OF CORRECTION

PATENT NO.    : 6,486,771 B1
DATED         : November 26, 2002
INVENTOR(S)   : Timothy C. Fuller, Melvin M. Priday and Max E. Butz It is certified that error appears in the above-identified patent and that said Letters Patent is hereby corrected as shown below:

<u>Column 11,</u>
Line 47, reads "P2(psig) = (8.875-1)14.696 = 115.47 psig", but should read -- P2(psig) = ($\underline{8.875}$-1)14.696 = 115.47 psig --.

Signed and Sealed this

Twenty-sixth Day of August, 2003

JAMES E. ROGAN
*Director of the United States Patent and Trademark Office*